United States Patent
Neukirchen et al.

(10) Patent No.: US 6,456,936 B1
(45) Date of Patent: *Sep. 24, 2002

(54) METHOD FOR STORING POSITION DATA IN PARTICULAR FOR USE IN A NAVIGATION AND/OR ROAD INFORMATION SERVICE SYSTEM

(75) Inventors: Ralph Neukirchen, Marl (DE); Jari Kaikkonen, Kangsala (FI); Jarkko Lempio, Tampere (FI); Kimmo Kauvo, Vammala (FI)

(73) Assignee: Nokia Mobile Phones Limited, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/311,048

(22) Filed: May 13, 1999

(30) Foreign Application Priority Data

May 14, 1998 (DE) .......................................... 198 21 750

(51) Int. Cl.⁷ ............................................. G06F 165/00
(52) U.S. Cl. ...................... 701/213; 701/35; 701/207; 701/213; 701/216; 340/988; 342/357.01; 342/357.13
(58) Field of Search .......................... 701/35, 200, 207, 701/213, 214, 216, 225; 342/357.01, 357.02, 357.06, 357.09, 357.12, 357.13; 340/988, 990, 995; 73/178 R (56) References Cited

U.S. PATENT DOCUMENTS

| 5,067,081 A | * | 11/1991 | Person ........................ 701/202 |
| 5,239,700 A | | 8/1993 | Guenther et al. ............ 455/158 |
| 5,278,763 A | * | 1/1994 | Agnew et al. ............... 701/200 |
| 5,774,828 A | | 6/1998 | Brunts et al. ................ 701/210 |
| 5,809,115 A | | 9/1998 | Inkinen ................... 379/93.05 |
| 6,078,865 A | * | 6/2000 | Koyanagi .................... 701/207 |
| 6,115,669 A | * | 9/2000 | Watanabe et al. ............ 701/209 |
| 6,138,073 A | * | 10/2000 | Uchigaki ..................... 701/208 |

FOREIGN PATENT DOCUMENTS

| EP | 0 810 571 A1 | 12/1997 |
| WO | WO 98/08055 | 2/1998 |

OTHER PUBLICATIONS

Patent Abstracts of Japan JP 08 068 657A.
Patent Abstracts of Japan JP 09 222 334 A.

* cited by examiner

Primary Examiner—Gertrude Arthur (57) ABSTRACT

The present invention relates to a method for storing position data, in particular for use in a navigation and/or road information service system. In order to simplify considerably the storage of position data, in particular for entering position data for setting up an electronically stored address book, the invention provides that the current position is detected with the aid of a position-finding system, the current position is allocated a title, and the current position is stored with the allocated title such that the stored position can be selected with the aid of the associated title.

23 Claims, 5 Drawing Sheets

FIG. 1

| FIG. 2A |
|---|
| ADDRESS BOOK |
| PROCESS |
| ADD |
| ERASE |

| FIG. 2B |
|---|
| ADD ENTRY |
| |
| CURRENT POSITION |
| ADDRESS |

| FIG. 2C |
|---|
| CURRENT POSITION |
| NAME OF THE STORED POSITION |
| FROM THE TELEPHONE DIRECTORY |
| ENTER MANUALLY |

| FIG. 2D |
|---|
| TELEPHONE DIRECTORY |
| ANDREA OFFICE |
| HARRY |
| STEFAN |

| FIG. 3A | FIG. 3B | FIG. 3C |
|---|---|---|
| ADDRESS BOOK | ADD ENTRY | MOST RECENT STOPS |
| PROCESS | CURRENT POSITION ADDRESS | 14.30 HRS SHORT STOP<br>15.50 HRS SHORT STOP |
| ADD | MOST RECENT STOPS | 17.15 HRS PARK |
| ERASE |  | 22.00 HRS OVERNIGHT |

FIG. 3E

TELEPHONE DIRECTORY

ANDREA OFFICE

HARRY

STEFAN

FIG. 3D

17.15 HRS PARK

NAME OF THE STORED POSITION

FROM THE TELEPHONE DIRECTORY

MANUAL ENTRY

FIG. 4A

| TRAFFIC INFO |
|---|
| RADIUS |
| DESTINATION-BASED |
| TOURING |

FIG. 4B

| DESTINATION ENTRY |
|---|
| FROM THE ADDRESS BOOK |
| FROM THE TOWN LIST |
| FROM THE MOST RECENT STOPS |
| MANUAL ENTRY |

FIG. 4C

| TELEPHONE DIRECTORY |
|---|
| ANDREA OFFICE |
| HARRY |
| STEFAN |

METHOD FOR STORING POSITION DATA IN PARTICULAR FOR USE IN A NAVIGATION AND/OR ROAD INFORMATION SERVICE SYSTEM

BACKGROUND OF THE INVENTION

1. Field of Invention

The invention relates to a method for storing position data, in particular for use in a navigation and/or road information service system.

2. Brief Description of Related Developments

Recently, road information service systems have been developed which are intended to assist the driver of a vehicle in searching for his route to the destination and/or in selecting the best travel route.

For example, navigation systems are known in which the driver enters the positions of the start and destination before starting to drive, and these are then transmitted by a telecommunications unit, for example a mobile telephone, to a central service provider. There, possibly taking account of the current traffic situation, a suitable travel route is composed and is transmitted to the user's terminal in which the data for the travel route are stored.

In order to allow the travel route information to be displayed as a function of the respective vehicle position in order to assist the driver, the vehicle position is detected using integrated navigation, or is provided from a GPS module.

Furthermore, a traffic information service is already known (T-Mobil Service Specification for the Traffic Information Service, in particular page 12 and page 39), in which a vehicle user can call the current traffic situation from a control centre on his way from a start position to his destination.

The traffic information request which is required for this purpose and is transmitted from a terminal which is used as the user unit, via, for example, a radio network to a control centre, is in this case essentially composed of the destination position and the start position. The destination position and start position must in this case be in a specific data format, which is called Geocode.

In order to compose the traffic information request, the user first of all selects the destination from a Geocode town list stored in the terminal or from a personal address book which is likewise stored in the terminal. If the destination is selected from the address book, the coordinates of the address must be converted to the appropriate Geocode. The start position is then entered, for which purpose the user can either confirm as the start position the current position, which can be confirmed, for example, with the aid of a GPS module, or the user makes use of the option of specifying a start position from the Geocode town list or from his personal address book, in which case, once again, the coordinates of the address from the address book must be converted to the appropriate Geocode.

Once the completely composed traffic information request has been transmitted to the control centre, the start position and destination position are used there to determine a selection region for which the current traffic information is composed.

Current traffic information composed for the selection region is then transmitted to the terminal, where it is displayed and stored.

Although, with this system, entering and/or selecting a destination position from a personal address book considerably improves the use of the system, particularly for routes which are travelled over frequently, it is tedious to enter the addresses in the address book, since the normal postal addresses must be stored, with the town, road, house number in a Geocode or in a position data format which can be converted to Geocode. This requires appropriate maps and/or tables, so that large amounts of data must be stored in each terminal or must be accessible, for example, via a CD-ROM.

With this in mind, the invention is based on the object of providing a method for storing position data, in particular for use in a navigation and/or road information service system, which considerably simplifies the storage of position data, in particular for entering position data for setting up an electronically stored address book.

This object is achieved by the method according to claim 1. Advantageous refinements of the invention are described in the dependent claims.

SUMMARY OF THE INVENTION

Thus, the invention provides a method for entering position data in a road information service system, in which method the current position is detected with the aid of a position-finding system, the current position is allocated a title and the current position is stored with the allocated title such that the stored position can be selected with the aid of the associated title in order to be used, in particular, as a destination position in a navigation and/or road information service system.

The method according to the invention thus allows the position data for any desired point at which a terminal of a navigation or road information service system is located to be stored electronically in a list without the position data having to be entered in a tedious manner. This allows the use of the navigation or road information service system to be considerably simplified and to be made more user-friendly.

The invention advantageously provides in this case for a satellite-supported position-finding system, in particular the GPS (Global Positioning System) to be used to detect the current position.

If the position data are intended to be used in a single information service system or in a number of information service systems which use the same position data format, then it is expedient if the position data for the detected position are converted, before being stored, into a data format which is suitable for the respective road information service system.

However, for use of the position data, it can also be advantageous if the position data for the detected position are stored in the data format provided by the position-finding system.

If, for example, the position data stored in an address book are intended to be used both in a traffic information service system which uses a specific Geocode with relatively low position accuracy and in a navigation system which provides high position accuracy, then the position data supplied from the satellite-supported position-finding system, that is to say by the GPS module, for example, are stored in this data format. The conversion to the respectively required data formats, that is to say to the Geocode for the traffic information service system or to a format which is suitable for the navigation system, is then in each case carried out after selection of the corresponding address.

In order to produce a user-specific address book, it is expedient for it to be possible to select the title which is to be allocated to the current position. This allows the position data to be stored electronically, together with any desired name, which can be predefined freely or is at least selectable, in a list which represents the personal address book and from which the position data for any desired stored points can then be selected.

An advantageous refinement of the invention provides that the title is entered via an input unit, and is thus selected.

In this case, the title can expediently be entered as an alphanumeric character string via a keyboard. This gives the user the option of freely creating the designations of the respective positions in the address book which he has himself composed, using an individual scheme.

The same option for designing his address book is provided for the user if the method according to the invention is distinguished by the title being entered as an alphanumeric character strip, in that the letters and numbers are selected individually from a list.

This refinement of the invention allows the terminal used by the information service user to have a simple hardware design. In this case it is, in particular, possible for the alphanumeric characters to be selected from the list by means of a turn-and-push controller.

One particularly convenient refinement of the invention is distinguished by the fact that the title can be selected from an existing list of names and/or designations. In this case, it is particularly expedient if the existing list is a stored telephone directory of a telecommunications unit which is used for data interchange with a control centre of the information service system, in which case, after selecting a name from the stored telephone directory as the designation of the detected position, its position data are linked to the selected telephone directory entry.

In order further to simplify the implementation of the method according to the invention, the existing list may comprise predefined terms from which a title can be selected. In this case, terms such as "apartment", "work", "office", "femalefriend", "malefriend", "parents" etc. are predefined as a title for specific position data, so that the user just needs to select one of these terms in order to designate a corresponding position if he wants to save himself the effort of entering a freely selected title. However, this procedure is also advantageous if the method according to the invention is intended to be implemented by using a particularly simple terminal in terms of hardware, that is to say a terminal with a user interface comprising as few control elements as possible.

A particularly advantageous refinement of the invention provides for the current position when stationary to be allocated a title, and for the current position subsequently to be stored together with this title. In this way, it is possible to automatically detect position data for points at which a user of a vehicle-based or freely portable navigation system has stopped for a certain period in order, for example, to take a break or to make a purchase.

In order to avoid detecting every random short stop whilst travelling or, when using a portable navigation system, while out for a walk or rambling, it is expedient if the current position, together with the title, is stored only when the stop lasts for longer than a predetermined time period, in which case the predetermined time period is adjustable.

Particularly when using the method according to the invention in a vehicle-based user unit of a navigation or road information service system, in order to avoid detecting the locations of all the traffic-related stops, resulting, for example, from traffic lights, level crossings or else traffic jams, an advantageous development of the invention provides that different, adjustable values can be selected for the predetermined time period for identifying that a vehicle has stopped, depending on the operating state of the vehicle, in order to distinguish between a traffic-related and a voluntary stop. The operating state of the vehicle can be detected, for example, by checking whether the engine is running or the ignition is switched on. If the ignition is switched on or the engine is running, that is to say the vehicle is not parked, then the predetermined time period is set to a long or very long value, for example to infinity, so that it is possible to entirely prevent stops caused by traffic being detected.

However, if the intention is to enter all points at which a vehicle has stopped for a relatively long time, irrespective of the operating state, in an electronic travel log, then the predetermined time period can be set to a value which allows relatively long stops during a traffic jam to be detected and the associated position data to be stored, in order to detect not only the time and location of the start and destination, but also intermediate stops, and to document the journey in detail.

To make it easier to find stored position data, it is advantageous if the title which is stored together with the current position comprises the information which identifies the associated stop, in particular data which identify the time and the nature of the stop.

One particularly expedient refinement of the invention is distinguished by the position of a stop being stored together with the allocated title in a database of the circular buffer type, in which case, in the data base, the data for the oldest stop, that is to say its position and the information which identifies it, are overwritten by the data for the latest, that is to say the most recent stop,- if the number of detected stops exceeds the number of available memory locations.

In order to allow the stored data relating to the latest stop to be transferred in a simple manner to a user-defined personal address book, the invention provides that the stored data for a detected stop can be selected, and in that the position data for the selected stop can be stored together with a freely selectable title, in particular a title which can be entered freely.

BRIEF DESCRIPTION OF THE DRAWINGS

The invention will be explained in more detail in the following text by way of example, using the drawing, in which.

DETAILED DESCRIPTION OF THE INVENTION

Figure 1:
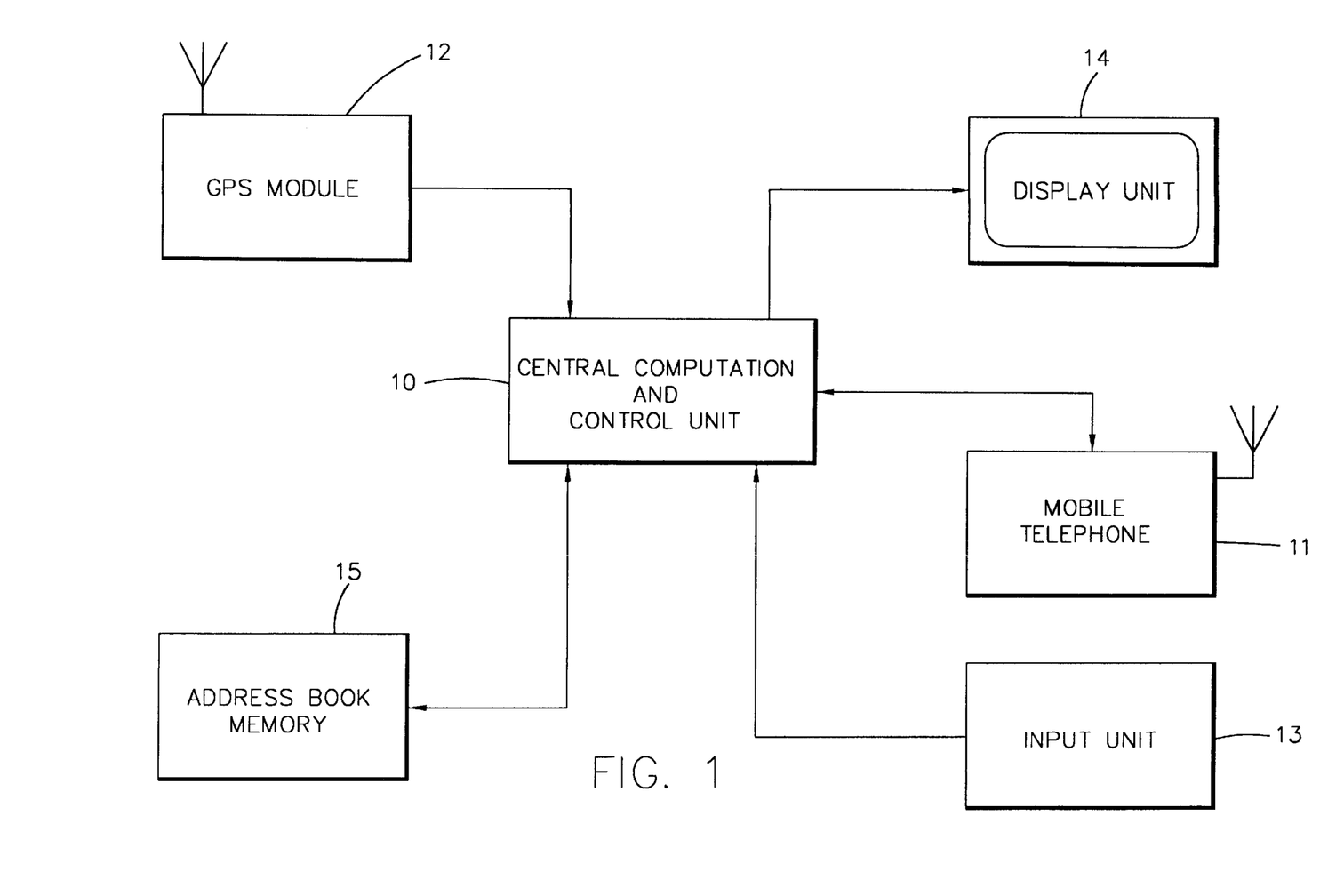
FIG. 1 shows a simplified schematic circuit diagram of a user unit for use as a terminal in an information service system.

As FIG. 1 shows, a user unit which can be used as a terminal in an information service system has a central computation and control unit 10 which, for example, is in the form of a microprocessor and to which a mobile telephone 11 for communication with a control centre of a road information service system and, for example, a GPS module 12 as a position-finding module of a satellite-supported position-finding system are connected as a telecommunications unit. An input unit 13 is provided to operate the user unit and may be, for example, a complete alphanumeric keyboard, a twelve-keypad as is also used for telephones, in particular for mobile telephones, or, in the simplest case, a turn-and-push controller. Instead of a separate input unit 13, it is also possible to use the keypad of the mobile telephone 11. A display unit 14 is expediently connected to the central computation and control unit 10 in order to display system acknowledgements during operation of the user unit and, in particular, while preparing for communication with the control centre of the information service system, as well as for displaying the information transmitted from the information service system to the user unit and stored there. The display unit 14 may in this case be, for example, a screen in the form of a liquid crystal display.

Furthermore, an address book memory 15 is connected to the central computation and control unit 10, in which address book memory 15 a user-defined list of destination positions or points is stored, with preferably user-defined location designations and position data. This list is controlled, for example, like an address book in an analogous manner to a telephone directory. The position data stored at a location designation in the electronic address book may be used later when requesting traffic information from a traffic information service, or when requesting journey information from a navigation service.

The method according to the invention will be explained in more detail in the following text with reference, first of all, to FIGS. 2(a)–2(d) by way of example. When operating the user unit, the user is offered not only a large number of operating functions via a menu item on the screen of the display unit 14 or via an input button, but also the option of detecting the current position of the user unit or the vehicle in which the user unit is installed, and of storing this together with a designation in the address book memory 15.

Figure 2A:
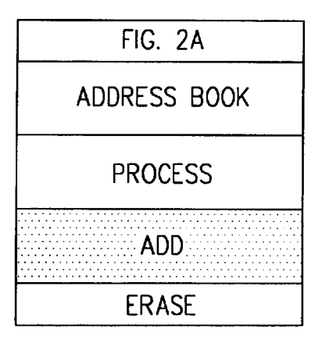
FIGS. 2(a)–2(d) show possible displays on a display unit when entering position data.
Figure 2B:
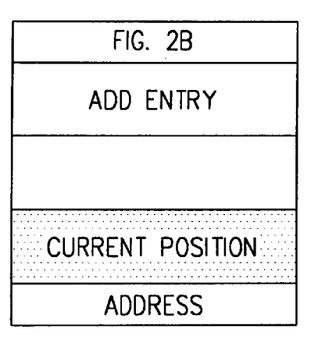

If this option, which is referred to by way of example in the following text as "address book", is called up, then, as is shown in FIG. 2(a), a menu window "address book" appears, by way of example, with the menu items "process", "add" and "erase". If the menu item "add" is selected from this in order to enter position data in accordance with the method according to the invention, then, for example, the display shown in FIG. 2(b) appears on the screen.

If the user selects the menu item "current position", then the current position is now detected by the current position data supplied from the GPS module 12 being detected and stored. The user is then requested to select a title for the current position. To do this, the menu item "current position"illustrated in FIG. 2(c) can be displayed, for example, on the screen of the display unit 14, which offers the user the option of selecting the designation or the name for the stored position either from a predetermined list, in the present case from a telephone directory provided in the mobile telephone 11, for which purpose the menu item "from the telephone directory" is provided, or, in accordance with the menu item "manual entry" of making a manual entry.

Figure 2C:
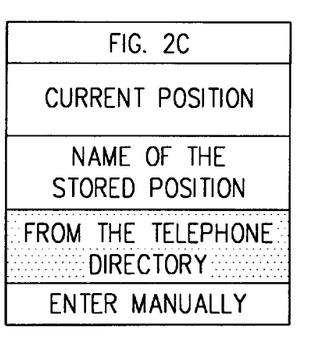
Figure 2D:
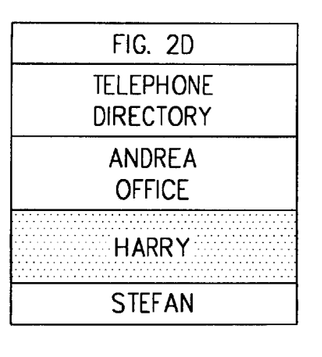

If, as in FIGS. 2(c) and (d), the option is selected of selecting the name for the stored position from the telephone directory, then the names of the individual telephone directory entries appear on the screen, from which the appropriate name can then be selected as the designation for the position.

A list of predefined words for selection of a designation for the current position can also be offered for manual entry of a designation for the stored position, in which case the name or the designation is entered as an alphanumeric character string, depending on the design of the input unit 13, via a complete alphanumeric keyboard, a twelve-keypad or, in the simplest case, by means of a turn-and-push controller.

After selection of the designation for the current position, the position data for the current position are stored together with the selected designation in the address book memory 15, so that they can be selected for use in the information service system.

The position data are in this case either stored as information in the form of degrees of latitude and longitude in the data format provided by the GPS module 12 or are converted in advance into a data format which is suitable for the respective information service system.

If the stored electronic address book is intended to be used for different information service systems, for example for a traffic information service system which requires a specific Geocode for the position data, and for a navigation service system which requires the position as information in the form of degrees of latitude and longitude with the relatively high accuracy provided by the GPS integration module 12, the position data are stored in the memory in the form provided by the GPS integration module 12.

Figure 4A:
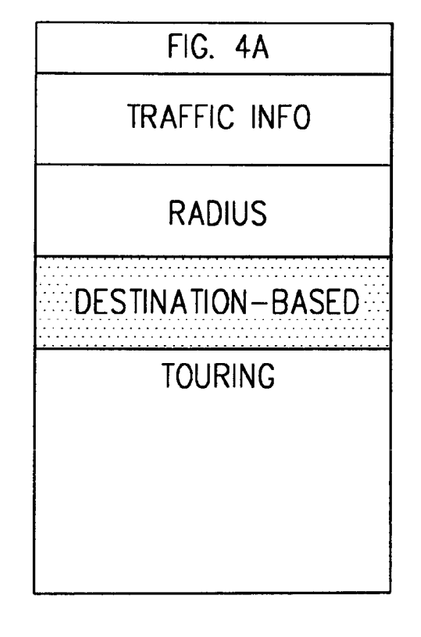
FIGS. 4(a)–4(c) show possible displays on a display unit when requesting traffic information from a traffic information service.
Figure 4B:
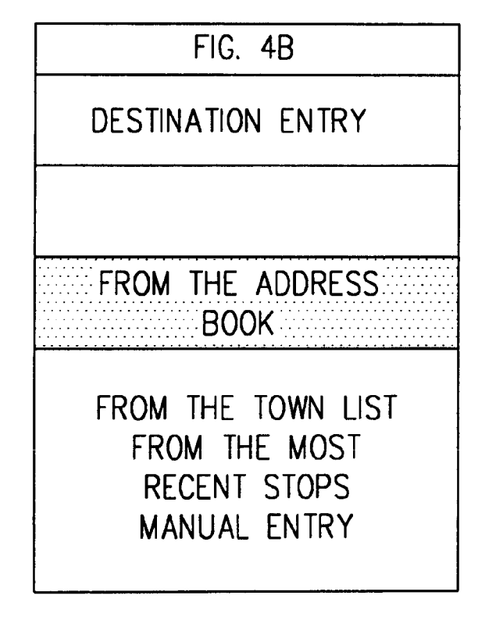
Figure 4C:
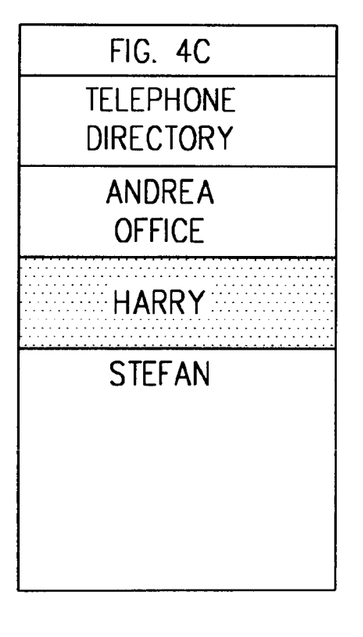

The following text describes the use of the address book when requesting traffic information, on the basis of FIGS. 4(c)–4(d). If the customer of a traffic information service system wishes to receive traffic information, then he uses an appropriate menu item or push-button to select the function "traffic info", when, for example, the menu window shown in FIG. 4(a) appears on the screen of the display unit 14. If the menu item "destination-based" is now selected from the menu items on offer, then the user is requested, as shown in FIG. 4(b), to enter a destination, for which purpose he can choose between a manual entry and selection of the destination from a town list, from his own address book or from a list for the latest stop, which will be explained in more detail below.

If he chooses his self-composed address book for the destination entry, then the address book entries are offered to him for selection, as is shown in FIG. 4(c). After selection of one of these address book entries, the position data stored under the selected designation are used to form a traffic information enquiry request, which is transmitted from the user unit, preferably via the mobile telephone, to the control centre of the traffic information service. Either the current position (provided by the GPS module) of the user unit or of a vehicle in which the user unit is fitted or a position which can likewise be selected or entered freely is in this case used as the start position.

Once the information enquiry request has been composed, this is transmitted via the mobile telephone 11 to the control centre of the information service system, where it is processed. The requested traffic information is then transmitted, and is received and stored by the user unit, so that the traffic information can be displayed on the display unit 14.

The request for journey information for a travel route in a navigation system is made in a corresponding manner.

Another exemplary embodiment of the invention provides that a user unit which is used as a terminal of a navigation and/or road information service system continuously checks whether the user unit is or is not moving. User unit position data supplied, for example, from the GPS module 12 are monitored for this purpose. If the user unit has a mobile telephone 11, as is shown in FIG. 1, then the position data can also be determined by the mobile telephone 11 communicating with at least two, and preferably three different base stations whose positions are known, in order then to use the delay times of the transmitted and received signals to calculate the distance to the base stations, so that the current position can be then calculated from these delay times.

In order to find out whether or not the user unit (which may be fitted in a vehicle, but may also be a portable user unit, integrated in a mobile telephone, of a navigation system, for example) is moving together with the vehicle and/or the user, current position data which are supplied at regular intervals are compared with the latest received position data. If the comparison shows that the current position data do not match the buffer-stored position data, then this means that the user unit is moving. In this case, the current position data are buffer-stored, instead of the previous stored position data, as the latest position data.

The comparison allows a certain amount of fluctuation in the position data to be taken into account, in order to avoid changes in the position data which are within an error or tolerance band appearing to be a deliberate movement of the user unit, although the user unit's location is not actually changing.

If it is found that the current position data match the stored latest position data, then a stopwatch function is started in order to determine the duration of a stop, that is to say the time period during which the user unit's position does not change. The stopwatch function, that is to say the determination of the time duration of a stop, may be carried out, for example, using a stop duration counter, which is kept at zero while the user unit is moving and which is incremented by one whenever a match is found between the newly detected current position data and the stored, latest position data.

Once the stop duration counter has been incremented by one, a check is then carried out, for example, to determine whether the count of the stop duration counter is greater than or equal to a predetermined threshold value which corresponds to a specific, adjustable time period. If the count of the stop duration counter is less than the predetermined threshold value, that is to say the time duration of the current stop is shorter than the predetermined time period, then this stop is not yet detected as such, and the method according to the invention continues to compare the continuously supplied position data with the stored latest position data.

Predefining a time period which is either permanently set to a suitable predefined value or is adjustable by the user results, for example when the method according to the invention is used in a user unit that is installed in a vehicle, in relatively short traffic-light stops or the like not being detected as stops. Entering an appropriate time period is particularly worthwhile when the user unit is a portable navigation unit which changes its location relatively slowly when the user is walking since, if this were not done, it would be possible for a stop to be identified even though the user had been continuing to move all the time.

If it is found in the comparison of the count of the stop duration counter with the threshold value, that is to say in the comparison of the already expired stop duration with the predetermined time period, that the stop duration so far is greater than or equal to the predefined time period, then a check is carried out to determine whether the current position data, which match the buffer-stored latest position data, are already stored together with a suitable title in a list or database. If the current position data are not yet stored, then they are stored in the list together with an appropriate title. The title in this case consists of information which identifies the corresponding stop, for example the time at which the stop occurred, the duration of the stop and the nature of the stop. The time of occurrence can in this case be stored in a suitable format. For example, it is possible to state the date and time of the start and/or end of the stop. The nature of the stop may be characterized, for example, by the duration, and may be identified as a "short stop", "long stop", "parking", "overnight stay" or the like.

The detected stop is expediently stored together with the respective information, representing a title, in a list or data base of the circular buffer type, that is to say in a memory with a fixed number of memory locations for corresponding data records, and in which, when all the memory locations available for the list or database are occupied, that memory location in which is stored the data record that has been stored for the longest time is in each case used to store a new data record. In this way, a circular buffer having, for example, 20 memory locations can thus be used to store the position data, with corresponding information, for the last 20 stops.

The use of such a memory structure has the advantage that, after a stop is found, only that memory location in which the latest position data have been written need in each case be checked in order to check whether the associated position data have or have not already been stored.

The described monitoring process is continued in an expedient manner until a user unit location change, and thus an end of the stop, have been found. After the end of a stop, the stop duration counter is reset to zero and the process of monitoring the change in the location of the user unit is continued. While monitoring one and the same stop, the duration of the stop and, depending on this, the nature of the stop as well are continuously updated so that, after the end of the stop, the data which characterize this stop are stored together with the position data of the location of the user unit during the stop. This detection of the position data for a stop is carried out independently of the user.

In the case of a portable user unit, it is also possible for a stop to be identified by using a movement or vibration sensor to reset a stop duration counter, with such a sensor responding to the movements and/or vibrations that occur during motion. If the method according to the invention is used with a user unit installed in a motor vehicle, it is thus in principle feasible to dispense with a stop duration counter and for a stop to be registered whenever the vehicle engine and/or the ignition are/is switched off.

Figure 3A:
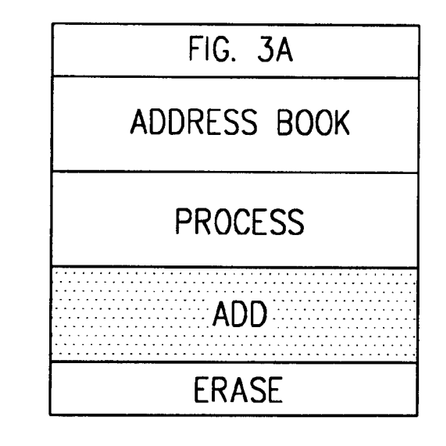
FIGS. 3(a)–3(d) show possible displays on a display unit when entering position data with increased options.
Figure 3B:
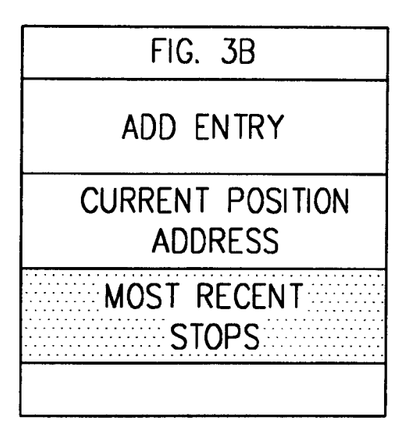
Figure 3C:
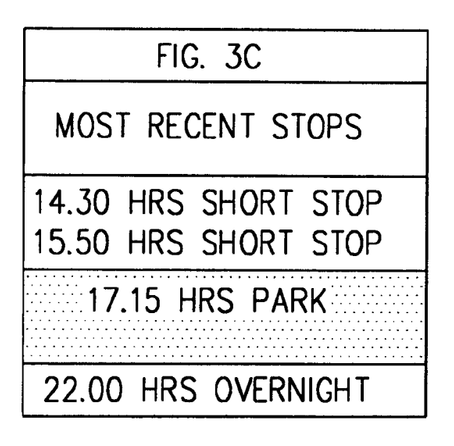

If the user intends to transfer to his address book the position data for a location at which he has paused, that is to say for example the location of a restaurant in which he has eaten while making a journey, then he can first of all use the address book function, which was described earlier and as shown in FIG. 3(a) to select the menu item "add". He is then offered, as shown in FIG. 3(b) various options, which also include the selection from the list of the most recent stops. If he chooses the menu item "most recent stops", then the most recent stops are displayed on a display unit, as is shown in FIG. 3(c). After choosing the desired stop, the user is then asked, in a manner corresponding to FIG. 3(d) how a name for the position to be transferred to the address book is intended to be entered. The telephone directory is also once again chosen in this case, as described above.

Figure 3D:
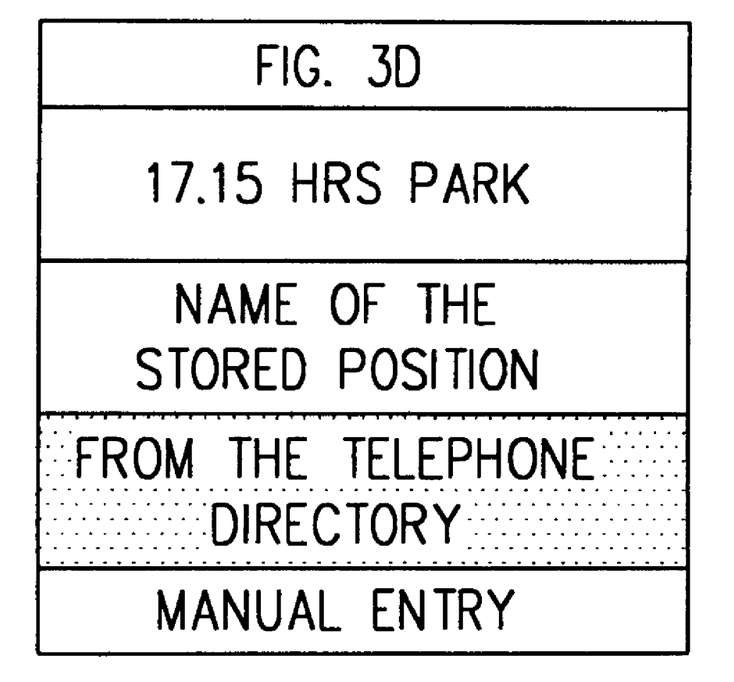
Figure 3E:
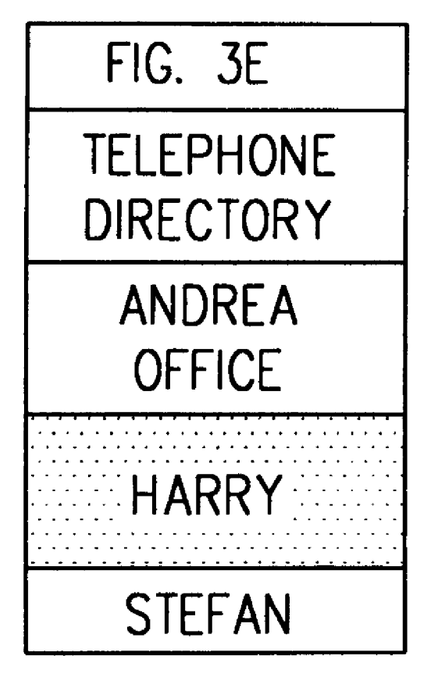

However, instead of transferring the designation for the position to be stored from the telephone directory, it is also possible to use a manual entry or to select a designation from a predefined list.

The list of the most recent stops (which is preferably stored in the form of a circular buffer) may be used just as well as an address book or a town list in order to use the positions (detected and stored in the described manner) of the most recent stops for navigation purposes.

In addition to the use of the continuously monitored stops for navigation purposes, the data relating to the individual stops and determined in the described manner may also be used for an electronic travel log, which automatically registers the individual journeys, with the relevant interruptions.

When used in a vehicle, it is in this case expedient when making the decision as to whether a stop should or should not be registered to monitor not only the change in position data but also the operating state of the vehicle. In the simplest case, it can be assumed that, as long as the engine is running, this is not a stop which represents a break or an interruption in the journey and should be registered. In this case, for example, monitoring does not need to be carried out continuously, but can be started as a function of the operating state of the engine, when it is switched off.

The monitoring algorithm can then be simplified accordingly.

However, it is also possible to carry out continuous monitoring and to set the predefinable time period to a relatively high value as a function of the operating state of the vehicle so that, although traffic-light stops or waiting times at level crossings are not detected as stops, longer stops caused by traffic jams are indeed registered also as stops when, for example when stationary in winter, the driver keeps the vehicle engine running, in order to keep the vehicle heating on. In this case, particularly when the position data relating to a stop and detected in this way are stored for an electronic travel log, the operating state of the vehicle can also be detected and stored as a further characteristic feature of the stop.

The method according to the invention opens up a wide range of additional options for use of a navigation system.

If, for example, a driver and his vehicle, in which a navigation system that uses the method according to the invention is installed, are in a strange town and he has found a suitable carpark there, from which he can easily make his purchases in the town then, if he wants to find this carpark again, then he just needs to select the corresponding stop from the list of most recent stops, and to enter this as the destination position for defining the travel route.

In the case of a portable navigation system user unit, another option is, for example, for a user to be able to find, for example, a cafe in a strange town quickly once again if he finds that he has left something there. In this case as well, he just needs to page through the list of most recent stops, and to select the appropriate stop for destination entry.

Furthermore, if he particularly likes the cafe, it is possible for him to transfer the corresponding location data in a simple manner to his personal address book, with a suitable individual designation.

One particularly advantageous use of the method according to the invention arises when a user has not only installed a corresponding navigation system in his vehicle but also has a mobile telephone which is equipped with such a navigation system. In this case, if, for example, he is in a strange town and cannot find the way back to his vehicle, he can simply use his mobile telephone to call up the navigation unit in his vehicle, interrogate the stored position data of the most recent stop there, that is to say, the position at which the vehicle is currently parked, and then use this as the destination position in the navigation unit of his mobile telephone in order to find his way back to his vehicle.

To allow the detection of the most recent stop to be used even more easily, it is possible, for example, to call up the list of most recent stops and/or the latest most recent stop stored as the most recent stop in the list directly by pushing a button, and to use this to enter a destination for a navigation system.

The position data for the most recent stops can be stored, together with the information that characterizes such data, in any suitable format.

In this case, the data records for the individual stops may be in a similar form to the so-called contact cards used for telecommunications. If the position data are stored in the form of so-called most-recent-stop-position cards, then an appropriate most-recent-stop-position-card generator can be provided which produces an appropriate most-recent-stop-position card as soon as a stop has been detected, which card is used to store the position data together with data that characterize the stop, such as the date and time, duration of the stop and the nature of the stop. Such a most-recent-stop-position-card generator can in this case also be used to store a current position without a stop actually occurring provided an appropriate activation means is provided for this purpose. Such an activation means may be, for example, a simple button or an operating button whose function can be set by software.

In order to make it easier to page through or search in a most-recent-stop list, it is possible to use an appropriate program to carry out filtering and sorting functions which allow, for example, the individual stops to be indicated sorted not only chronologically, in the same way that they are stored in a circular buffer, but, for example, also on the basis of the nature of the stop. In this case, it is, for example, possible to have only short stops displayed, or only those stops which were associated with an overnight stay.

Furthermore, it is conceivable for specific, selected position data relating to. a stop to be transferred in a suitable format (that is to say, for example, in a corresponding manner to a contact card format in a most-recent-stop-position card format of similar design) to a service provider, who compares the respective position data with known position data, for example for restaurants, hotels, road junctions etc., and if a match is found transmits the appropriate most-recent-stop-position card back with a new or additional designation.

What is claimed is:

1. A method for storing position data for use in a navigation information service system comprising the steps of:
    detecting a current position of a user unit using a position-finding system;
    allocating the current position a title arbitrarily selected by the user; and
    storing the current position together with the allocated title in a memory of a user unit wherein the stored position can be selected with the aid of the allocated title.

2. A method according to claim 1, wherein a satellite-supported position-finding system is used to detect the current position.

3. A method according to claim 1, wherein the position data for the detected position are converted, before being stored, into a data format which is suitable for further use in a respective road information service system.

4. A method according to claim 1, wherein the position data for the detected position are stored in the data format provided by the position-finding system.

5. Method according to claim 1, characterized in that it is possible to select the title to be allocated to the current position.

6. Method according to claim 5, characterized in that the title is entered via an input unit, and is thus selected.

7. Method according to claim 6, characterized in that the title is entered as an alphanumeric character string via a keyboard.

8. Method according to claim 6, characterized in that the title is entered as an alphanumeric character string, in that the letters and numbers are selected individually from a list.

9. Method according to claim 8, characterized in that the alphanumeric characters are selected from the list by means of a turn-and-push controller.

10. Method according to claim 1, characterized in that the title can be selected from an existing list of names and/or designations.

11. Method according to claim 10, characterized in that the existing list is a stored telephone directory of a telecommunications unit (11) which is used for data interchange with a control centre of the information service system.

12. Method according to claim 11, characterized in that after selecting a name from the stored telephone directory as a designation of the detected position, its position data are linked to the selected telephone directory entry.

13. Method according to claim 10, characterized in that the existing list comprises predefined terms, from which a title can be selected.

14. A method according to claim 1, wherein when the user unit is stationary, the current position of the user unit is allocated a title, and the current position of the user unit is subsequently stored together with this title.

15. A method according to claim 14, wherein the current position, together with the title, is stored only when a stop lasts for longer than a predetermined time period.

16. Method according to claim 15, characterized in that the predetermined time period is adjustable.

17. The method according to claim 15, wherein different, adjustable time period values can be selected for the predetermined time period for identifying that the user unit has stopped, wherein the predetermined time period is used together with an operating state of the vehicle to distinguish between a traffic-related stop for which the current position is not to be stored and a voluntary stop for which the current position is to be stored.

18. Method according to claim 14, characterized in that the position of a stop is stored together with the allocated title in a database of the circular buffer type.

19. A method according to claim 18, wherein in the database, the data for an oldest stop, comprising the position and the information which identifies the oldest stop, are overwritten by the data for a latest stop, comprising a most recent stop, when a number of detected stops exceeds a number of available memory locations.

20. A method for storing position data for use in a navigation information service system comprising the steps of:

detecting a current position of a user unit using a position-finding system;

allocating the current position a title; and storing the current position with the allocated title in a memory of the user unit when a stop lasts for longer than a predetermined time period, wherein the stored position can be selected with the aid of the allocated title, and different adjustable time period values can be selected for the predetermined time period for identifying that the user unit has stopped, wherein the predetermined time period is used together with an operating state of the vehicle to distinguish between a traffic-related stop for which the current position is not to be stored and a voluntary stop for which the current position is to be stored.

21. A method according to claim 20 wherein the title stored together with the current position comprises information which identifies the associated stop.

22. Method according to claim 21, characterized in that the information which identifies the stop comprises data which identify the time and the nature of the stop.

23. A method according to claims 20, wherein the stored data for a detected stop can be selected, and the position data for the selected stop can be stored together with a freely selectable title which can be entered.

* * * * *